United States Patent
Tomita

(10) Patent No.: US 11,059,488 B2
(45) Date of Patent: Jul. 13, 2021

(54) CONTROL DEVICE OF VEHICLE

(71) Applicant: TOYOTA JIDOSHA KABUSHIKI KAISHA, Toyota (JP)

(72) Inventor: Takashi Tomita, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/820,858

(22) Filed: Mar. 17, 2020

(65) Prior Publication Data

US 2020/0298862 A1 Sep. 24, 2020

(30) Foreign Application Priority Data

Mar. 20, 2019 (JP) .............................. JP2019-053766

(51) Int. Cl.
*B60W 30/192* (2012.01)
*F02D 41/06* (2006.01)
*B60W 10/10* (2012.01)
*B60W 10/06* (2006.01)

(52) U.S. Cl.
CPC .......... *B60W 30/192* (2013.01); *B60W 10/06* (2013.01); *B60W 10/10* (2013.01); *F02D 41/062* (2013.01); *F02D 2200/50* (2013.01)

(58) Field of Classification Search
CPC ...... B60W 10/06; B60W 10/10; B60W 10/11; B60W 30/18018; B60W 30/192; B60W 2030/206; B60W 2710/06; F02D 41/062; F02D 2200/50

See application file for complete search history.

(56) References Cited

U.S. PATENT DOCUMENTS

| 2002/0157888 | A1* | 10/2002 | Michioka ............... B60K 28/16 180/197 |
| 2016/0160999 | A1* | 6/2016 | Kinoshita ............... F16H 61/18 477/97 |
| 2017/0268444 | A1* | 9/2017 | Nishimura .......... F02D 41/0225 |
| 2018/0290647 | A1* | 10/2018 | Kang ..................... B60W 10/02 |

FOREIGN PATENT DOCUMENTS

| JP | 2016-94949 A | 5/2016 |
| JP | 2018-17295 A | 2/2018 |

* cited by examiner

*Primary Examiner* — Edwin A Young
(74) *Attorney, Agent, or Firm* — Oblon, McClelland, Maier & Neustadt, L.L.P.

(57) ABSTRACT

A control device of a vehicle including an engine, a power transmission device, a shift operation device, and a switching device includes: a shift-switching control portion outputting the control command signal when it is determined that the shift switching is permitted, and not outputting the control command signal when it is determined that the shift switching is prohibited, at the time of a shift switching operation; and an engine-starting control portion outputting a first signal causing the shift-switching control portion to determine that the shift switching is prohibited and initiating starting of the engine after determining that the shift switching is not being performed when it is determined that the shift switching is permitted at the time of an engine starting operation performed by the driver for starting the engine, and immediately initiating the engine when it is determined that the shift switching is prohibited.

8 Claims, 6 Drawing Sheets

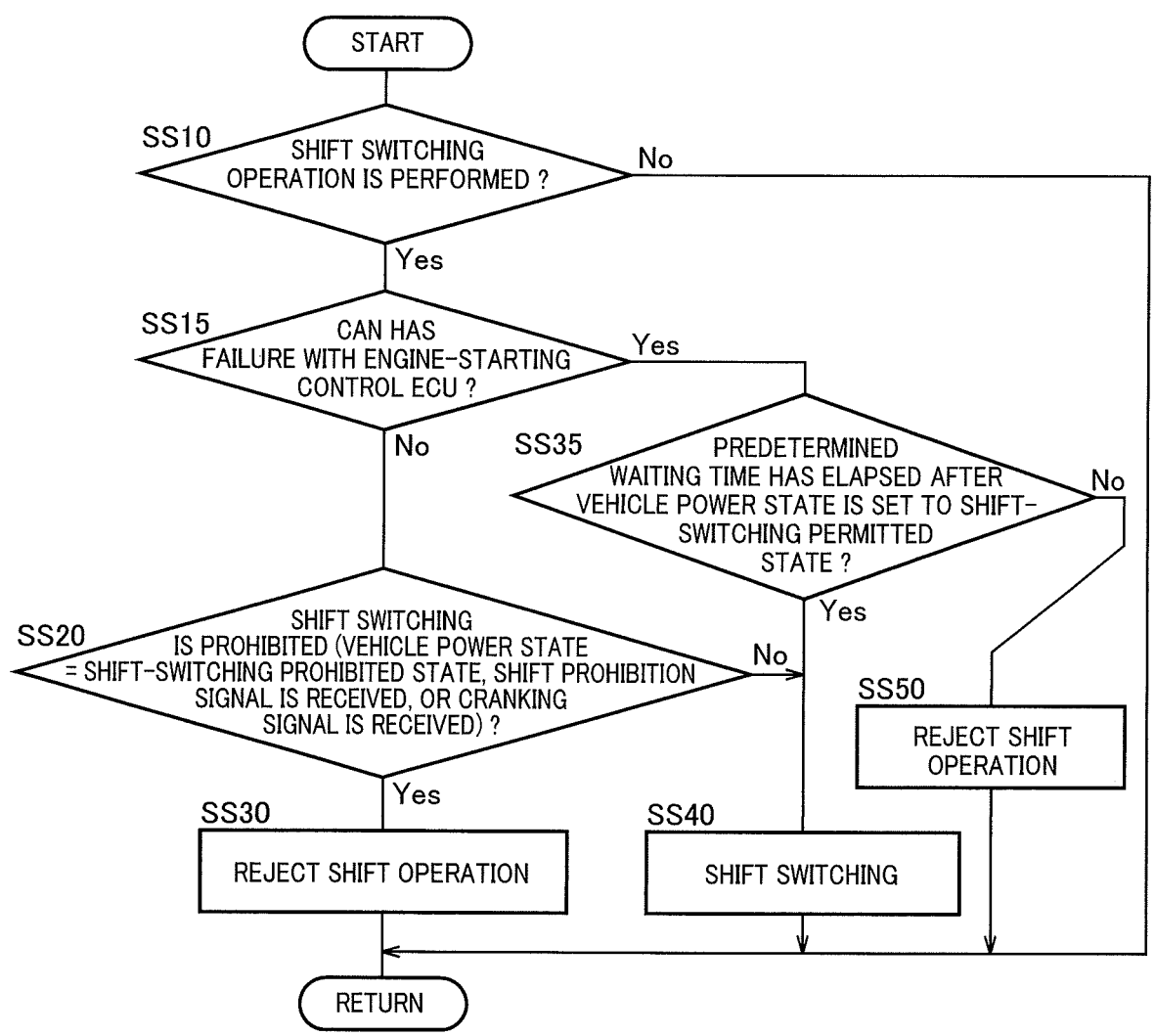

CONTROL DEVICE OF VEHICLE

This application claims priority from Japanese Patent Application No. 2019-053766 filed on Mar. 20, 2019, the disclosure of which is herein incorporated by reference in its entirety.

FIELD OF THE INVENTION

The present invention relates to a control device of a vehicle switching a shift position of a power transmission device based on a control command signal.

DESCRIPTION OF THE RELATED ART

For a vehicle including an engine, a power transmission device, a shift operation device operated by a driver to an operation position corresponding to a shift position of the power transmission device, and a switching device performing shift switching for switching a shift position of the power transmission device through actuation of an electric actuator based on a control command signal corresponding to the operation position, a control device of a vehicle is well known. For example, this corresponds to a control device of a vehicle described in Patent Document 1. It is disclosed in Patent Document 1 that when an engine restart command is output while an engine is temporarily turned off to stop idling, a predetermined time is set for determining whether a shift switching command for performing shift switching is output and that the shift switching is preferentially performed if the shift switching command is output within the predetermined time, while the engine is started if the shift switching command is not output within the predetermined time.

PRIOR ART DOCUMENT

Patent Document

Patent Document 1: Japanese Laid-Open Patent Publication No. 2018-17295

SUMMARY OF THE INVENTION

Technical Problem

Regarding engine starting, in addition to the engine starting performed while idling is stopped, the engine starting is also performed in association with an engine starting operation by a driver. To prevent the engine starting associated with the engine starting operation from being performed simultaneously with the shift switching by the switching device, the technique disclosed in Patent Document 1 described above may be applied to the engine starting operation. In this case, the initiation of the engine starting is always delayed by a predetermined time relative to the engine starting operation. Therefore, when the engine starting is performed in association with the engine starting operation, the driver easily feels uncomfortable with the delay in initiation of the engine starting as compared to when the engine is automatically restarted while idling is stopped.

The present invention was conceived in view of the situations and it is therefore an object of the present invention to provide a control device of a vehicle capable of suppressing a driver's uncomfortable feeling while preventing engine starting associated with an engine starting operation from being performed simultaneously with shift switching by a switching device.

Solution to Problem

To achieve the above object, a first aspect of the present invention provides a control device of a vehicle including (a) an engine, a power transmission device, a shift operation device operated by a driver to an operation position corresponding to a shift position of the power transmission device, and a switching device performing shift switching for switching the shift position of the power transmission device through actuation of an electric actuator based on a control command signal corresponding to the operation position, the control device comprising: (b) a shift-switching control portion outputting the control command signal when it is determined that the shift switching is permitted, and not outputting the control command signal when it is determined that the shift switching is prohibited, at the time of a shift switching operation performed by the driver for causing the switching device to perform the shift switching; and (c) an engine-starting control portion outputting a first signal causing the shift-switching control portion to determine that the shift switching is prohibited and initiating starting of the engine after determining that the shift switching is not being performed when it is determined that the shift switching is permitted at the time of an engine starting operation performed by the driver for starting the engine, and immediately initiating the engine when it is determined that the shift switching is prohibited.

A second aspect of the present invention provides the control device of the vehicle recited in the first aspect of the invention, wherein the engine-starting control portion determines whether the shift switching is being performed based on whether a predetermined delay time has elapsed from output of the first signal.

A third aspect of the present invention provides the control device of the vehicle recited in the second aspect of the invention, wherein the predetermined delay time includes a first predefined time that is a maximum time required for the shift switching.

A fourth aspect of the present invention provides the control device of the vehicle recited in any one of the first to third aspects of the invention, wherein the engine-starting control portion initiates starting of the engine while the shift switching is permitted, and wherein the engine-starting control portion outputs a second signal causing the shift-switching control portion to maintain the determination that the shift switching is prohibited, and initiates starting of the engine when it is determined that the shift switching is prohibited at the time of the engine starting operation performed by the driver.

A fifth aspect of the present invention provides the control device of the vehicle recited in the fourth aspect of the invention, wherein at the time of the shift switching operation performed by the driver, the shift-switching control portion outputs the control command signal when a second failure preventing the transmission of the second signal has occurred and a predetermined waiting time has elapsed from permission of the shift switching, and suspends outputting the control command signal when the second failure has occurred and the predetermined waiting time has not elapsed.

A sixth aspect of the present invention provides the control device of the vehicle recited in the fifth aspect of the invention, wherein the predetermined waiting time includes a second predefined time that is a maximum time required for starting the engine.

A seventh aspect of the present invention provides the control device of the vehicle recited in any one of the first to sixth aspects of the invention, wherein when it is determined the shift switching is permitted and a first failure preventing the transmission of the first signal has occurred at the time of the engine starting operation performed by the driver, the engine-starting control portion makes a change such that the shift switching is prohibited, and suspends starting the engine in association with the engine starting operation.

An eighth aspect of the present invention provides the control device of the vehicle recited in any one of the first to seventh aspects of the invention, wherein each of the shift-switching control portion and the engine-starting control portion determines that the shift switching is permitted when a power supply state of the vehicle is a first state in which the shift switching is permitted, and determines that the shift switching is prohibited when the power supply state is a second state in which the shift switching is prohibited.

Advantageous Effects of Invention

According to the first aspect of the invention, when the shift switching is permitted at the time of an engine starting operation, the first signal causing the shift-switching control portion to determine that the shift switching is prohibited is output, and the engine starting is initiated after it is determined that the shift switching is not being performed, and therefore, the shift switching is prohibited when the shift switching is possibly performed, and even though the shift switching is started before the shift switching is prohibited, the engine starting is performed while the shift switching is not being performed after completion of the shift switching. On the other hand, when the shift switching is prohibited at the time of the engine starting operation, the engine starting is immediately initiated, so that the engine starting is promptly performed when shift switching is not performed. Therefore, a driver's uncomfortable feeling can be suppressed while the engine starting associated with the engine starting operation is prevented from being performed simultaneously with the shift switching by the switching device.

According to the second aspect of the invention, whether the shift switching is being performed is determined based on whether the predetermined delay time has elapsed from output of the first signal, so that whether the shift switching is being performed can properly be determined.

According to the third aspect of the invention, the predetermined delay time includes a predefined maximum time required for the shift switching, so that the engine starting is properly prevented from being performed simultaneously with the shift switching.

According to the fourth aspect of the invention, when the shift switching is prohibited at the time of the engine starting operation, the second signal causing the shift-switching control portion to maintain the determination that the shift switching is prohibited is output before initiation of the engine starting, and therefore, the shift-switching control portion maintains the determination that the shift switching is prohibited when the engine starting is initiated after the state is changed to a shift-switching permitted state. As a result, even though the engine starting is immediately started when the shift switching is prohibited, the engine starting may properly be prevented from being performed simultaneously with the shift switching.

According to the fifth aspect of the invention, when a failure preventing the transmission of the second signal has occurred at the time of the shift switching operation and the predetermined waiting time has elapsed from permission of the shift switching, the control command signal serving as a basis for the shift switching is output, so that even though the engine starting is initiated while the shift switching is permitted when a failure preventing the transmission of the second signal has occurred, the engine starting may be prevented from being performed simultaneously with the shift switching. On the other hand, when the predetermined waiting time has not elapsed, the control command signal is not output, so that when a failure preventing the transmission of the second signal has occurred and the engine starting may be performed simultaneously with the shift switching, the shift switching is not performed.

According to the sixth aspect of the invention, the predetermined waiting time includes a predefined maximum time required for the engine starting, so that even when a failure preventing the transmission of the second signal has occurred, the engine starting may properly be prevented from being performed simultaneously with the shift switching.

According to the seventh aspect of the invention, when the shift switching is permitted and a failure preventing the transmission of the first signal has occurred at the time of the engine starting operation, a change is made such that the shift switching is prohibited, and the engine starting associated with the engine starting operation is not performed, so that when a failure preventing the transmission of the first signal has occurred and the engine starting may be performed simultaneously with the shift switching, the engine starting is not performed. Additionally, when the engine starting operation is performed next time, the shift switching is prohibited, so that the engine starting may immediately be started.

According to the eighth aspect of the invention, when the power supply state of the vehicle is the first state in which the shift switching is permitted, it is determined that the shift switching is permitted, and when the power supply state is the second state in which the shift switching is prohibited, it is determined that shift switching is prohibited, so that whether the shift switching is permitted or prohibited can properly be determined.

BRIEF DESCRIPTION OF DRAWINGS

FIG. 6 is a flowchart for explaining the main portion of control actuation of the electronic control device, i.e., control actuation for suppressing the driver's uncomfortable feeling while preventing the engine starting from being performed simultaneously with the shift switching, is an example different from the flowchart of FIG. 3, and particularly shows the control actuation of a shift-switching control portion capable of dealing with a failure of the CAN communication system.

MODES FOR CARRYING OUT THE INVENTION

An example of the present invention will now be described in detail with reference to the drawings.

Example 1

Figure 1:
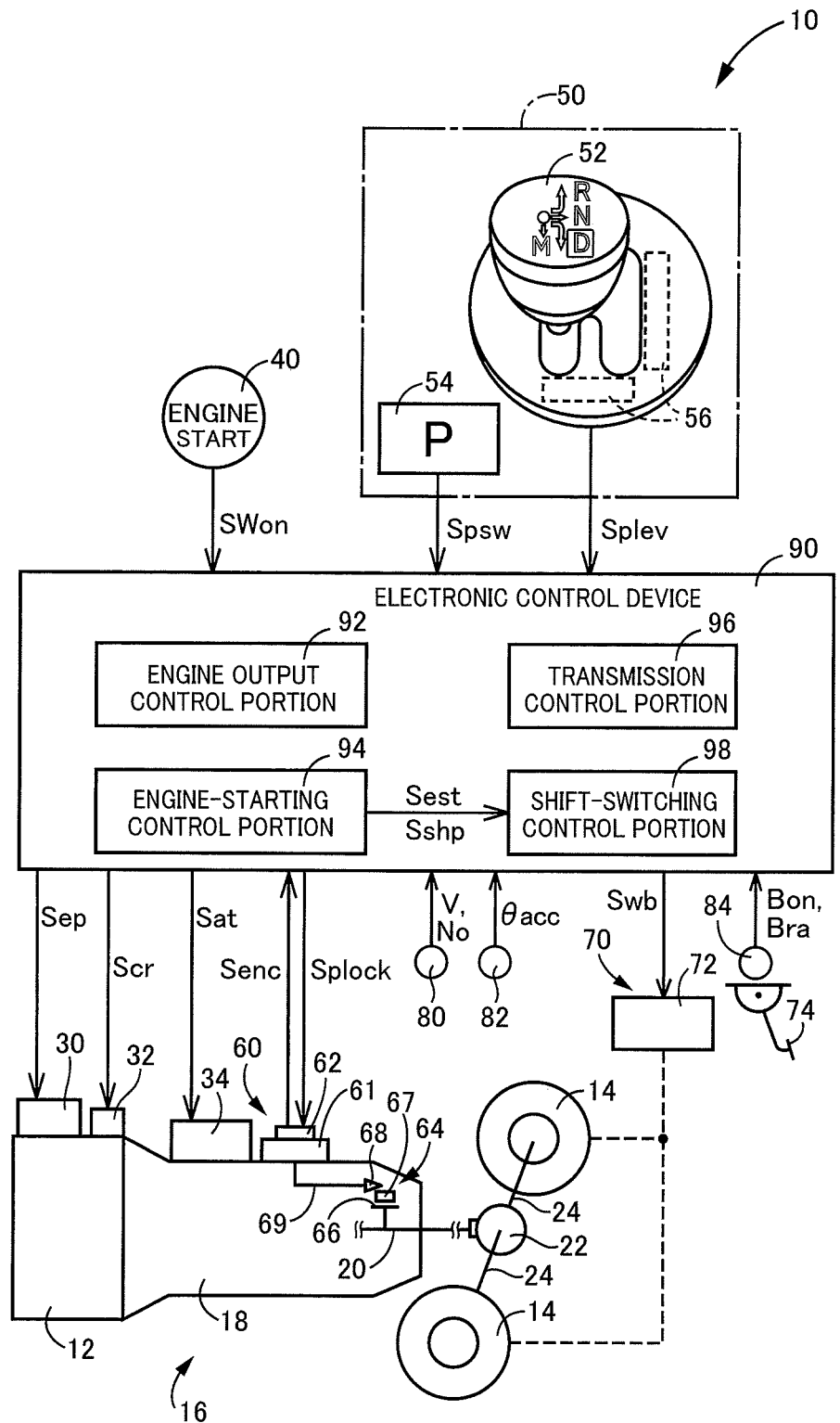
FIG. 1 is a diagram showing a schematic configuration of a vehicle to which the present invention is applied, and is also a diagram for explaining main portions of control functions and control systems for various controls in the vehicle.

FIG. 1 is a diagram showing a schematic configuration of a vehicle 10 to which the present invention is applied. FIG. 1 is also a diagram for explaining main portions of control functions and control systems for various controls in the vehicle 10. In FIG. 1, the vehicle 10 includes an engine 12, drive wheels 14, and a power transmission device 16 transmitting a power of the engine 12 to the drive wheels 14.

The engine 12 is a motive power source for running of the vehicle 10 and is a known internal combustion engine such as a gasoline engine and a diesel engine. The engine 12 has an engine torque Te that is an output torque of the engine 12 controlled by an electronic control device 90 described later controlling an engine control device 30 such as a throttle actuator, a fuel injection device, and an ignition device included in the vehicle 10. The engine 12 in a stop state is cranked. i.e., started, when a starter 32 included in the vehicle 10 is controlled by the electronic control device 90.

The power transmission device 16 includes an automatic transmission 18 coupled to the engine 12, a differential gear device 22 coupled to an output shaft 20 that is an output rotating member of the automatic transmission 18, left and right axles 24 coupled to the differential gear device 22, etc. In the power transmission device 16, a power output from the engine 12 is transmitted to the automatic transmission 18 and is transmitted from the automatic transmission 18 through the differential gear device 22 etc. to the drive wheels 14. The power has the same meaning as a torque and a force if not particularly distinguished.

For example, the automatic transmission 18 is an automatic transmission such as a known planetary gear type automatic transmission, a known belt type continuously variable transmission, a known synchronous meshing type parallel two-shaft automatic transmission, or a known DCT (dual clutch transmission). In the automatic transmission 18, for example, an actuation state of an actuator in the automatic transmission 18 is switched by a hydraulic pressure output from a hydraulic control circuit 34 included in the vehicle 10, so that gears are shifted in accordance with a driver's accelerator operation, a vehicle speed V, etc. The hydraulic control circuit 34 adjusts the hydraulic pressure output to the automatic transmission 18 under control of the electronic control device 90 described later.

The vehicle 10 further includes an engine switch 40, a shift operation device 50, a switching device 60, a wheel brake device 70, etc.

The engine switch 40 is a switch operated by the driver to switch a power source supply state of the vehicle 10, i.e., a vehicle power state. The engine switch 40 is also a switch operated by the driver to start the engine 12. For example, the engine switch 40 is a momentary type push button switch and is subjected to a pushing operation by the driver to a switch-on position. Each time the engine switch 40 is subjected to the pushing operation to the switch-on position, the engine switch 40 outputs a switch operation signal SWon corresponding to the switch-on position to the electronic control device 90. The electronic control device 90 detects the driver's operation of the engine switch 40 based on the switch operation signal SWon. The driver's operation of the engine switch 40 is a power switch operation for switching the vehicle power state and is an engine starting operation for starting the engine 12. Switching of the vehicle power state and starting of the engine 12 are performed by the electronic control device 90 described later depending on the switch operation signal SWon, an operation position POSsh described later, a brake-on signal Bon described later, etc. In this example, the starting of the engine 12 is also referred to as engine starting, and the engine starting operation is also referred to as an engine start operation.

For example, the vehicle power state includes a state of off (="OFF") as an off state, a state of accessory-on (="ACC") as a partially on state, and a state of ignition-on (="IGON") as an on state. For example, the OFF state is a power state for disabling vehicle running and disabling a portion of functions not related to vehicle running. For example, the ACC state is a power state for turning off a combination meter not shown and disabling vehicle running while enabling a portion of functions not related to vehicle running. For example, the IGON state is a power state for turning on the combination meter and enabling vehicle running.

When the operation position POSsh is a P-operation position and a brake pedal 74 described later is not depressed during stop of the engine 12, the vehicle power state is switched to OFF→ACC→IGON→OFF→ . . . each time the engine switch 40 is pushed. When the engine switch 40 is pushed while the operation position POSsh is the P-operation position or an N-operation position and the brake pedal 74 is depressed during stop of the engine 12, the engine is started regardless of the vehicle power state. The IGON state is a power state in which the engine 12 can be started when the engine 12 is in a stopped state, and a power state in which an operating state of the engine 12 can be maintained when the engine 12 is in the operating state. When the engine switch 40 is pushed while the engine 12 is in operation during stop of the vehicle, the engine 12 is stopped.

The shift operation device 50 is an operation device for allowing a person to select multiple types of shift positions in the automatic transmission 18, i.e., an operation device operated by a person to accept a request for switching the shift position of the automatic transmission 18. The shift operation device 50 is operated by the driver to the operation position POSsh corresponding to the shift position of the automatic transmission 18. For example, the operation position POSsh includes P-, R-, N-, D-, and M-operation positions. The shift position of the automatic transmission 18 has the same meaning as a shift range of the automatic transmission 18.

The P-operation position is a parking operation position for selecting a parking position (=P position) of the automatic transmission 18 at which the automatic transmission 18 is brought into a neutral state and the output shaft 20 is mechanically prevented from rotating. The neutral state of the automatic transmission 18 is a state in which power transmission is interrupted in the automatic transmission 18, i.e., a state in which the automatic transmission 18 cannot transmit power. The state with the output shaft 20 mechanically prevented from rotating is a parking lock (=P-lock) state in which the output shaft 20 is non-rotatably fixed. The output shaft 20 is non-rotatably fixed by the switching device 60.

The R-operation position is a reverse running operation position for selecting a reverse running position (=R position) of the automatic transmission 18 at which the vehicle 10 can run backward. The N-operation position is a neutral operation position for selecting a neutral position (=N position) of the automatic transmission 18 at which the automatic transmission 18 is brought into the neutral state. The D-operation position is a forward running operation position for selecting a forward running position (=D position) of the automatic transmission 18 at which the vehicle 10 can run forward. The M-operation position is a manual shift operation position for selecting a manual shift position (=M position) of the automatic transmission 18 enabling the driver to manually shift gears of the automatic transmission 18 through operation of a paddle switch etc.

The shift operation device 50 includes operation elements selectively operated by the driver to multiple operation positions POSsh. For example, the operation elements are a shift lever 52 and a P switch 54. Both the shift lever 52 and the P switch 54 are momentary type operation elements returned to original positions when no external force is applied.

To set the shift position of the automatic transmission 18 to a desired shift position that is one of multiple non-P positions other than the P position, the shift lever 52 is selectively operated by the driver to the operation position POSsh corresponding to the desired shift position. The non-P positions are shift positions at which the P-lock state is released, and are the R, N, D, and M positions, for example. The P switch 54 is operated by the driver to set the shift position of the automatic transmission 18 to the P position. The operation positions POSsh settable by operating the shift lever 52 are the R-, N-, D-, and M-operation positions, for example, and the operation position POSsh settable by operating the P switch 54 is the P-operation position, for example.

The shift operation device 50 includes a lever position sensor 56 detecting the R-, N-, D-, and M-operation positions of the shift lever 52 and outputs a lever position signal Splev corresponding to the R-, N-, D-, or M-operation position to the electronic control device 90 described later. The electronic control device 90 detects an operation to the R-, N-, D-, or M-operation position based on the lever position signal Splev. The operation to the R-, N-, D-, or M-operation position is a shift operation for switching the shift position of the automatic transmission 18 to one of the R, N, D, M positions and is also referred to as a shift lever operation.

For example, the P switch 54 is a momentary type push button switch and is subjected to a pushing operation by the driver to the P-operation position. Each time the P switch 54 is pushed to the P-operation position, the P switch 54 outputs a P-switch signal Spsw corresponding to the P-operation position to the electronic control device 90 described later. The electronic control device 90 detects the operation to the P-operation position based on the P-switch signal Spsw. The operation to the P-operation position is a shift operation for switching the shift position of the automatic transmission 18 to the P position and is also referred to as a P-switch operation.

The switching device 60 includes an electric actuator 61, an encoder 62, a parking lock mechanism 64, etc. The parking lock mechanism 64 includes a parking lock gear 66, a parking lock pawl 67, a cam 68, a parking rod 69, etc. The parking lock gear 66 is a member disposed to rotate integrally with the output shaft 20. The parking lock pawl 67 has a claw portion meshing with gear teeth of the parking lock gear 66 and is a member capable of meshing with the parking lock gear 66. The cam 68 is disposed at a tip of the parking rod 69 on the parking lock pawl 67 side and is a taper member moved toward the parking lock pawl 67 to cause the parking lock pawl 67 to mesh with the parking lock gear 66. The parking rod 69 is a member supporting the cam 68 at one end portion and is mechanically coupled to the electric actuator 61 via a member not shown on the other end side. The switching device 60 is a P-lock device switching the P-lock state and a non-P-locked state achieved by releasing the P-lock state when the electric actuator 61 is actuated based on a P-switching control command signal Splock from the electronic control device 90 described later and switches the shift position of the automatic transmission 18 between the P position and the non-P position. For example, when the P-switch operation of the P switch 54 is detected, the electric actuator 61 is controlled by the electronic control device 90 such that the cam 68 is urged toward the parking lock pawl 67, and the parking rod 69 and the cam 68 are actuated. As a result, the parking lock pawl 67 is moved toward the parking lock gear 66. When the parking lock pawl 67 is moved to a position at which the parking lock pawl 67 meshes with the parking lock gear 66, the output shaft 20 is non-rotatably fixed together with the parking lock gear 66, and the drive wheels 14 rotating in conjunction with the output shaft 20 are non-rotatably fixed. In the vehicle 10, the shift position of the automatic transmission 18 is switched by using a shift-by-wire (=SBW) system.

As described above, the switching device 60 is a switching device performing the shift switching for switching the shift position of the automatic transmission 18 through the actuation of the electric actuator 61 based on the P-switching control command signal Splock that is a control command signal corresponding to the operation position POSsh. Therefore, the shift lever operation and the P-switch operation by the driver are shift switching operations for causing the switching device 60 to perform the shift switching. The shift switching by the switching device 60 is prohibited when the vehicle power state is the OFF or ACC state. On the other hand, the shift switching by the switching device 60 is permitted when the vehicle power state is the IGON state. Therefore, when the vehicle power state is the IGON state, the vehicle power state is in a shift-switching permitted state corresponding to the first state in which the shift switching by the switching device 60 is permitted. When the vehicle power state is the OFF state or the ACC state, the vehicle power state is in a shift-switching prohibited state corresponding to the second state in which the shift switching by the switching device 60 is prohibited.

The wheel brake device 70 is a brake device applying a brake torque from a wheel brake to wheels. The wheel brake device 70 includes a brake actuator 72, a brake pedal 74, etc. The wheel brake device 70 supplies a brake hydraulic pressure to a wheel cylinder through the brake actuator 72 depending on a state of a brake operation of the brake pedal 74 by the driver. In the wheel brake device 70, normally, a master cylinder hydraulic pressure having a magnitude corresponding to a brake operation amount Bra in the brake pedal 74 is generated from a brake master cylinder and directly supplied as a brake hydraulic pressure to a wheel cylinder. On the other hand, for example, in the wheel brake device 70 at the time of ABS control or vehicle speed control, the brake hydraulic pressure necessary for each of the controls is supplied to the wheel cylinder regardless of the brake operation amount Bra so as to generate the brake torque from the wheel brake. The wheels are the drive wheels 14 and driven wheels not shown.

The vehicle 10 further includes the electronic control device 90 as a controller including a control device of the vehicle 10. The electronic control device 90 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 90 performs output control of the engine 12, shift control of the automatic transmission 18, switching control of the shift position of the automatic transmission 18 by the switching device 60, etc. and is configured separately for the engine control, the shift control, the SBW control, etc. as needed.

The electronic control device 90 is supplied with various signals etc. (e.g., the switch operation signal SWon, the P-switch signal Spsw, the lever position signal Splev, a pulse signal Senc for acquiring an encoder count corresponding to the actuation position of the electric actuator 61 in the switching device 60, an output rotation speed No that is a rotation speed of the output shaft 20 corresponding to the vehicle speed V, an accelerator opening degree Oacc defined as a driver's accelerating operation amount representative of a magnitude of a driver's accelerating operation, a brake-on signal Bon that is a signal indicative of a state in which the brake pedal 74 is operated by the driver, and a brake operation amount Bra representative of a magnitude of a driver's break-pedal depressing operation of the brake pedal 74) based on detection values from various sensors etc. included in the vehicle 10 (e.g., the engine switch 40, the P switch 54, the lever position sensor 56, the encoder 62, an output rotation speed sensor 80, an accelerator opening sensor 82, and a brake pedal sensor 84).

The electronic control device 90 outputs to the devices included in the vehicle 10 (e.g., the engine control device 30, the starter 32, the hydraulic control circuit 34, the electric actuator 61, and the brake actuator 72) various control command signals (e.g., an engine output control command signal Sep for controlling the output of the engine 12, a cranking control command signal Scr for cranking the engine 12, a transmission control command signal Sat for controlling the automatic transmission 18, the P-switching control command signal Splock for controlling the operation of the switching device 60, and a wheel-brake control command signal Swb for controlling the brake torque from the wheel brake).

To implement the various controls in the vehicle 10, the electronic control device 90 includes an engine output control means, i.e., an engine output control portion 92, an engine-starting control means, i.e., an engine-starting control portion 94, a transmission control means, i.e., a transmission control portion 96, and a shift-switching control means, i.e., a shift-switching control portion 98.

The engine output control portion 92 calculates a required drive force Frdem [N] at the drive wheels 14 as a drive request amount by applying the accelerator opening degree θacc and the vehicle speed V to, for example, a drive request amount map that is a relationship obtained empirically or through design and stored in advance, i.e., a predefined relationship. The engine output control portion 92 outputs the engine output control command signal Sep for controlling the engine 12 so as to obtain the engine torque Te at which the required drive force Frdem is achieved, in consideration of a speed change ratio etc. of the automatic transmission 18. A required drive torque Trdem [Nm] at the drive wheels 14, a required drive power Prdem [W] at the drive wheels 14, a required output torque at the output shaft 20, etc. can also be used as the drive request amount, in addition to the required drive force Frdem.

For example, when an input of the switch operation signal SWon is detected while an engine staring condition is satisfied, i.e., while the operation position POSsh is the P-operation position or the N-operation position and the brake-on signal Bon is input, during stop of the engine 12, the engine-starting control portion 94 outputs the cranking control command signal Scr for driving the starter 32 in the IGON state of the vehicle power state. As a result, the engine 12 is cranked by the starter 32. When an engine rotation speed Ne is increased by cranking, the engine-starting control portion 94 outputs the engine output control command signal Sep for operating the engine 12 to the engine control device 30 to start the engine 12. When the engine starting operation is performed by the driver while the vehicle power state is the OFF or ACC state, the cranking control command signal Scr is output after the vehicle power state is changed to the IGON state.

The transmission control portion 96 determines a shift of the automatic transmission 18 by using, for example, a shift map that is a predefined relationship, and outputs the transmission control command signal Sat for providing the shift control of the automatic transmission 18 as needed. The shift map is a predetermined relationship having shift lines for determining the shift of the automatic transmission 18 on two-dimensional coordinates using the vehicle speed V and the required drive force Frdem as variables, for example.

The shift-switching control portion 98 electrically switches the shift position of the automatic transmission 18 by the switching device 60 based on the operation position POSsh in the shift operation device 50. Specifically, the shift-switching control portion 98 sets a requested position that is a shift position of the automatic transmission 18 desired by the driver, based on the lever position signal Splev and the P-switch signal Spsw. The shift-switching control portion 98 performs switching to the shift position of the automatic transmission 18 corresponding to the requested position. When the shift position is the non-P position and an input of the P-switch signal SpSW is detected, the shift-switching control portion 98 sets the P position as the requested position and outputs the P-switching control command signal Splock for switching the shift position to the P position to the electric actuator 61. On the other hand, when the shift position is the P position and an input of the lever position signal Splev is detected, the shift-switching control portion 98 sets the non-P position as the requested position and outputs the P-switching control command signal Splock for switching the shift position to the non-P position to the electric actuator 61. Additionally, the shift-switching control portion 98 sets the shift position to any of the R, N, and D positions corresponding to the lever position signal Splev.

When shift switching is performed by the switching device 60, a voltage is applied to the electric actuator 61 from a battery not shown mounted on the vehicle 10. When the engine starting is performed, a voltage is also applied to the starter 32 from the battery. Therefore, if the shift switching and the engine starting are simultaneously performed, at least one of the shift switching and the engine starting may not properly be controlled due to a voltage reduction of the battery. In this regard, for example, when the engine starting operation is performed by the driver, an execution state of the shift switching may always be confirmed before initiating the engine state, so as to prevent the shift switching from being performed simultaneously with the engine starting. However, when the engine is started in association with the engine starting operation, this causes the driver to easily feel uncomfortable with a delay in initiation of the engine starting. Description will hereinafter be made of suppressing the driver's uncomfortable feeling while preventing the shift switching from being performed simultaneously with the engine starting.

When it is determined that the shift switching is permitted at the time of the shift switching operation performed by the driver, the shift-switching control portion 98 outputs the P-switching control command signal Splock to perform the shift switching. On the other hand, when it is determined that the shift switching is prohibited at the time of the shift switching operation performed by the driver, the shift-switching control portion 98 does not output the P-switching control command signal Splock. The shift-switching control portion 98 rejects the shift switching operation by not outputting the P-switching control command signal Splock.

The shift-switching control portion 98 determines that the shift switching is permitted when the vehicle power state is the shift-switching permitted state and determines that the shift switching is prohibited when the vehicle power state is the shift-switching prohibited state. The shift-switching permitted state corresponds to the first state, and the shift-switching prohibited state corresponds to the second state of the present invention. Specifically, the shift-switching control portion 98 determines whether shift switching is prohibited based on whether the vehicle power state is the shift-switching prohibited state.

The engine-starting control portion 94 determines that the shift switching is permitted when the vehicle power state is the shift-switching permitted state and determines that the shift switching is prohibited when the vehicle power state is the shift-switching prohibited state. Specifically, the engine-starting control portion 94 determines whether the vehicle power state is the shift-switching prohibited state.

When the vehicle power state is the shift-switching permitted state, the shift switching is possibly performed during the engine starting. When it is determined that the shift switching is permitted at the time of the engine starting operation performed by the driver, the engine-starting control portion 94 outputs a first signal causing the shift-switching control portion 98 to determine that the shift switching is prohibited, and initiates the engine starting after determining that the shift-switching control portion 98 is not performing the shift switching. The engine-starting control portion 94 outputs the cranking control command signal Scr to initiate the engine starting.

The first signal is an engine start signal, i.e., a cranking signal Sest, notifying the shift-switching control portion 98 that the engine starting is performed. This cranking signal Sest is transmitted to the shift-switching control portion 98.

The shift-switching control portion 98 determines that shift switching is prohibited when receiving the cranking signal Sest output from the engine-starting control portion 94 even though the vehicle power state is the shift-switching permitted state.

The engine-starting control portion 94 determines whether the shift switching is being performed based on whether a predetermined delay time has elapsed from output of the cranking signal Sest. The predetermined delay time includes a predefined maximum time required for the shift switching. The predefined maximum time corresponds to the first predefined time of the present invention. The predetermined delay time may include a communication time until the cranking signal Sest is transmitted to the shift-switching control portion 98. Therefore, the predetermined delay time is a delay time TMdy for delaying the initiation of the engine starting until completion of shift switching even if the shift-switching control portion 98 has already started the shift switching before receiving the cranking signal Sest. The delay time TMdy is set in consideration of shift switching performance, system communication time, etc.

On the other hand, when the vehicle power state is the shift-switching prohibited state, the shift switching is not performed. When it is determined that the shift switching is prohibited at the time of the engine starting operation performed by the driver, then, the engine-starting control portion 94 initiates the engine starting. Specifically, immediately after input of the switch operation signal SWon, i.e., simultaneously with input of the switch operation signal SWon, the engine-starting control portion 94 outputs the cranking signal Sest and outputs the cranking control command signal Scr to immediately initiate the engine starting.

When the vehicle power state is the shift-switching prohibited state, the engine starting is initiated after the vehicle power state is changed to the shift-switching permitted state. In other words, the engine-starting control portion 94 initiates the engine starting while the shift switching is permitted. Therefore, the shift-switching prohibited state is desirably continued until the engine 12 is started. When it is determined that the shift switching is prohibited at the time of the engine starting operation performed by the driver, the engine-starting control portion 94 outputs a second signal causing the shift-switching control portion 98 to maintain the determination that the shift switching is prohibited, and initiates the engine starting.

The second signal is a shift prohibition signal Sshp notifying the shift-switching control portion 98 that permission of the shift switching is not determined even when the vehicle power state is changed to the shift-switching permitted state. This shift prohibition signal Sshp is transmitted to the shift-switching control portion 98 before the vehicle power state is changed to the shift-switching permitted state.

The shift-switching control portion 98 determines that the shift switching is prohibited when receiving the shift prohibition signal Sshp output from the engine-starting control portion 94 even though the vehicle power state is the shift-switching permitted state.

The engine-starting control portion 94 cancels the prohibition of the shift switching, i.e., terminates shift prohibition, after completion of the engine starting, i.e., after completion of cranking. After receiving the cranking signal Sest, the shift-switching control portion 98 determines that the shift switching is prohibited until end of cranking. After end of cranking, the vehicle power state is set to the shift-switching permitted state. The shift-switching control portion 98 determines that the shift switching is permitted after end of cranking.

Figure 2:
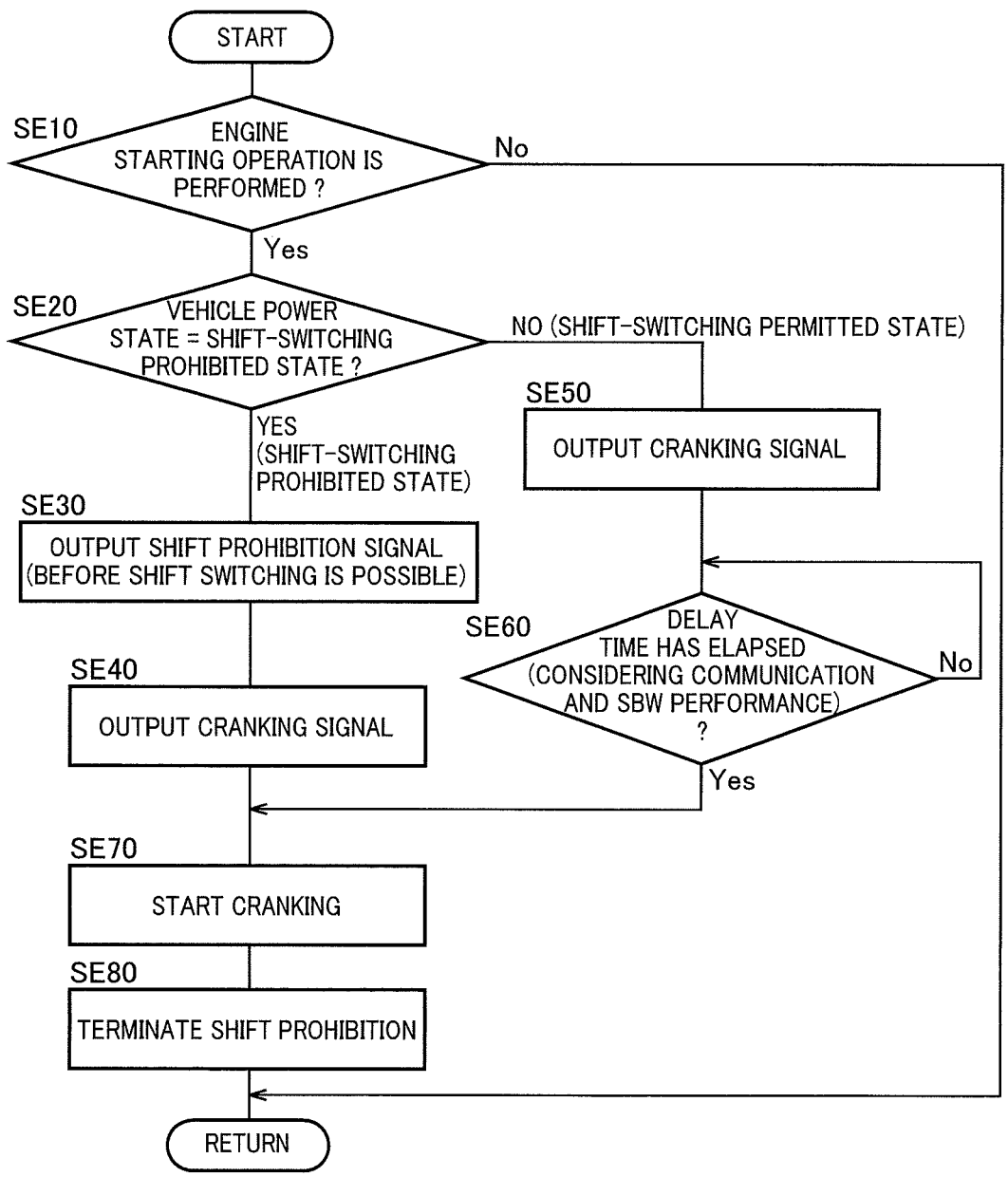
FIG. 2 is a flowchart for explaining a main portion of control actuation of an electronic control device, i.e., control actuation for suppressing a driver's uncomfortable feeling while preventing the engine starting from being performed simultaneously with the shift switching, and particularly shows the control actuation of an engine-starting control portion.
Figure 3:
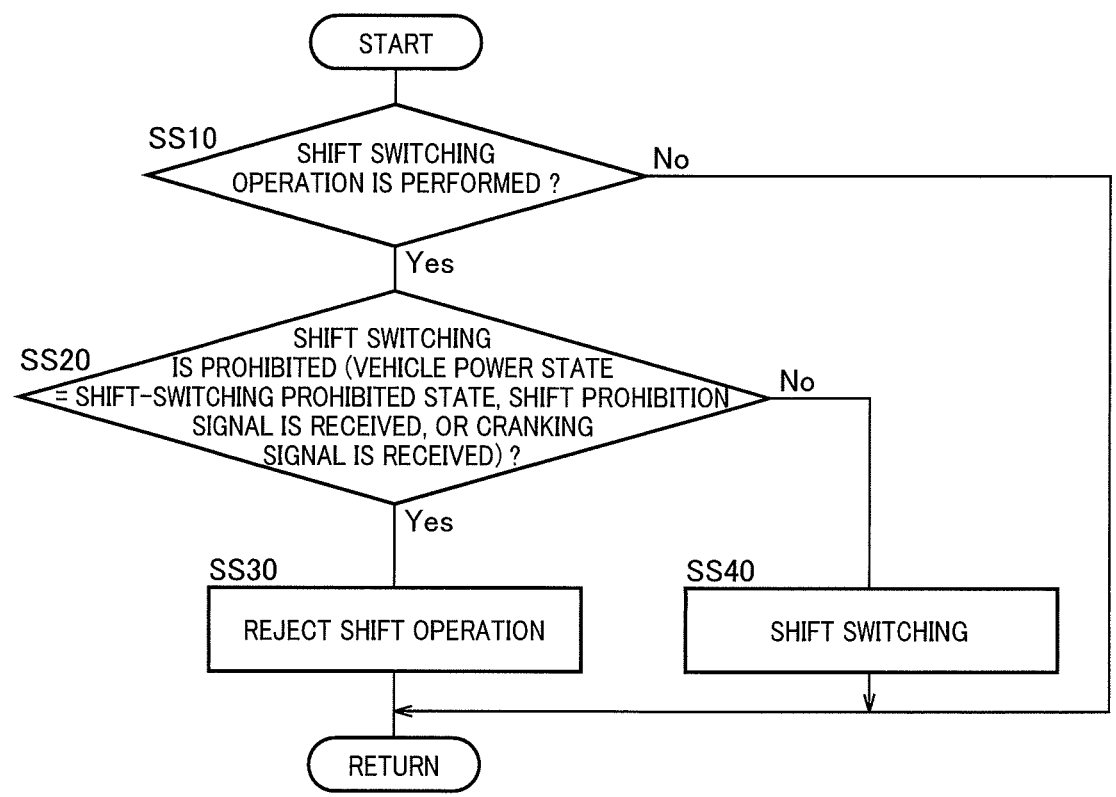
FIG. 3 is a flowchart for explaining the main portion of control actuation of the electronic control device, i.e., control actuation for suppressing the driver's uncomfortable feeling while preventing the engine starting from being performed simultaneously with the shift switching, and particularly shows the control actuation of a shift-switching control portion.

Each of FIGS. 2 and 3 is a flowchart for explaining a main portion of control actuation of the electronic control device 90, i.e., control actuation for suppressing a driver's uncomfortable feeling while preventing the engine starting from being performed simultaneously with the shift switching, and is repeatedly executed, for example. FIG. 2 particularly shows the control actuation of the engine-starting control portion 94. Steps in the flowchart of FIG. 2 correspond to the function of the engine-starting control portion 94. FIG. 3 particularly shows the control actuation of the shift-switching control portion 98. Steps in the flowchart shown in FIG. 3 correspond to the function of the shift-switching control portion 98.

In FIG. 2, first, at step (hereinafter, step is omitted) SE10, it is determined whether the input of the switch operation signal SWon is detected, i.e., whether the engine starting operation is performed by the driver, while the engine starting condition is satisfied during stop of the engine 12. If the determination of SE10 is negative, this routine is terminated. If the determination of SE10 is affirmative, it is determined in SE20 whether the vehicle power state is the shift-switching prohibited state. If the determination of SE20 is affirmative, the shift prohibition signal Sshp is output at SE30. Subsequently, at SE40, the cranking signal Sest is output. On the other hand, if the determination of SE20 is negative, the cranking signal Sest is output at SE50. Subsequently, at SE60, it is determined whether the delay time TMdy has elapsed from the time point of output of the cranking signal Sest. If the determination of SE60 is negative, SE60 is repeatedly executed. After SE40 or if the determination of SE60 is affirmative, cranking of the engine 12 is started at SE70. Subsequently, at SE80, the shift prohibition is terminated after completion of the cranking.

In FIG. 3, first, at SS10, it is determined whether the shift switching operation is performed by the driver, based on the lever position signal Splev and the P-switch signal Spsw. If the determination of SS10 is negative, this routine is terminated. If the determination of SS10 is affirmative, it is determined at SS20 whether the shift switching is prohibited. Specifically, if the vehicle power state is the shift-switching prohibited state, if the shift prohibition signal Sshp is received, or if the cranking signal Sest is received, it is determined that the shift switching is prohibited. If the vehicle power state is not the shift-switching prohibited state and neither the shift prohibition signal Sshp nor the cranking signal Sest is received, it is determined that the shift switching is permitted. If the determination of SS20 is affirmative, the shift switching operation determined as being performed at SS10 is rejected at SS30. On the other hand, if the determination of SS20 is negative, the shift switching is performed at SS40 in accordance with the shift switching operation determined as being performed at SS10.

As described above, according to this example, when the shift switching is permitted at the time of the engine starting operation, the cranking signal Sest is output, and the engine starting is initiated after it is determined that the shift switching is not being performed, and therefore, the shift switching is prohibited when the shift switching is possibly performed, and even though the shift switching is started before the shift switching is prohibited, the engine starting is performed while the shift switching is not being performed after completion of the shift switching. On the other hand, when the shift switching is prohibited at the time of the engine starting operation, the engine starting is immediately initiated, so that the engine starting is promptly performed when shift switching is not performed. Therefore, even if the shift switching operation is performed at the time of the engine starting, the driver's uncomfortable feeling can be suppressed while the engine starting associated with the engine starting operation is prevented from being performed simultaneously with the shift switching by the switching device 60.

According to this example, whether the shift switching is being performed is determined based on whether the delay time TMdy has elapsed from output of the cranking signal Sest, so that whether the shift switching is being performed can properly be determined.

According to this example, the delay time TMdy includes a predefined maximum time required for the shift switching, so that the engine starting is properly prevented from being performed simultaneously with the shift switching.

According to this example, when the shift switching is prohibited at the time of the engine starting operation, the shift prohibition signal Sshp is output before initiation of the engine starting, and therefore, the shift-switching control portion 98 maintains the determination that the shift switching is prohibited when the engine starting is initiated after the vehicle power state is changed to the shift-switching permitted state. As a result, even though the engine starting is immediately started when the shift switching is prohibited, the engine starting may properly be prevented from being performed simultaneously with the shift switching.

According to this example, when the vehicle power state is the shift-switching permitted state, it is determined that the shift switching is permitted, and when the vehicle power state is the shift-switching prohibited state, it is determined that shift switching is prohibited, so that whether the shift switching is permitted or prohibited can properly be determined Another example of the present invention will be described. In the following description, the portions common to the examples are denoted by the same reference numerals and will not be described.

Example 2

In Example 1 described above, it is described that the electronic control device 90 is configured separately for the engine control, the shift control, the SBW control, etc. as needed. In this example, description will be made of an example when the electronic control device 90 is configured separately for the engine control, the SBW control, etc.

Figure 4:
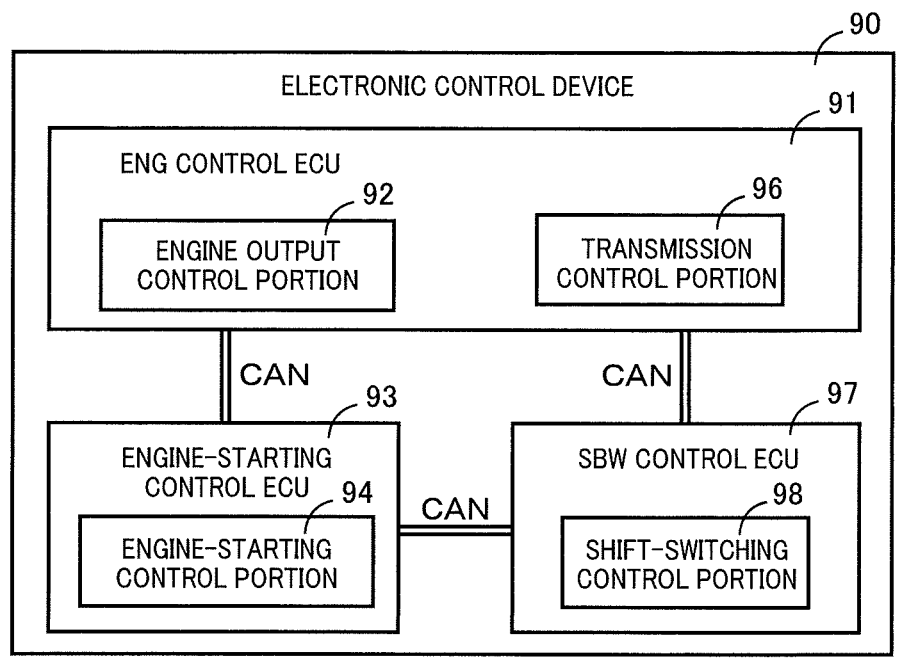
FIG. 4 is a diagram showing an example when the electronic control device is configured separately for an ENG control ECU, an engine-starting control ECU, and an SBW control ECU.

FIG. 4 is a diagram showing an example when the electronic control device 90 is configured separately for an ENG control ECU 91 serving as a control device for the engine control and the shift control, an engine-starting control ECU 93 serving as a control device for the engine-starting control, and an SBW control ECU 97 serving as a control device for the SBW control. In FIG. 4, the ENG control ECU 91 includes an engine output control portion 92, a transmission control portion 96, etc. The engine-starting control ECU 93 includes an engine-starting control portion 94 etc. The SBW control ECU 97 includes a shift-switching control portion 98 etc.

Various signals are transmitted among the ENG control ECU 91, the engine-starting control ECU 93, and the SBW control ECU 97 through a predetermined communication system, for example, a CAN (controller area network) communication system.

A failure of the CAN communication system between the engine-starting control ECU 93 and the SBW control ECU 97 may occur due to disconnection of a communication line between the engine-starting control ECU 93 and the SBW control ECU 97. Occurrence of such a failure interrupts communication from the engine-starting control ECU 93 to the SBW control ECU 97. Therefore, the shift-switching control portion 98 cannot detect a state of the engine starting by the engine-starting control portion 94. For example, the shift-switching control portion 98 cannot receive the cranking signal Sest or the shift prohibition signal Sshp output from the engine-starting control portion 94. This may make it unable to prevent the engine starting associated with the engine starting operation from being performed simultaneously with the shift switching by the switching device 60. Regarding such a problem, when determining that intercommunication is interrupted, each of the engine-starting control portion 94 and the shift-switching control portion 98 performs control actuation different from the control actuation of Example 1, i.e., the control actuation of the normal time, so as to prevent the engine starting from being performed simultaneously with the shift switching. The control actuation different from the control actuation of the normal time will hereinafter be described.

When the shift switching operation is performed by the driver, the shift-switching control portion 98 determines whether the CAN communication system has failure between the engine-starting control ECU 93 and the SBW control ECU 97. For example, the shift-switching control portion 98 determines whether a failure preventing the transmission of the shift prohibition signal Sshp has occurred due to a failure in the CAN communication system. The failure preventing the transmission of the shift prohibition signal Sshp corresponds to the second failure of the present invention. When a predetermined waiting time TMwt has elapsed from permission of the shift switching at the time of determination that a failure preventing the transmission of the shift prohibition signal Sshp has occurred, the shift-switching control portion 98 outputs the P-switching control command signal Splock. On the other hand, when the predetermined waiting time TMwt has not elapsed from permission of the shift switching at the time of determination that a failure preventing the transmission of the shift prohibition signal Sshp has occurred, the shift-switching control portion 98 does not output the P-switching control command signal Splock.

The phrase "from permission of the shift switching" means "after the vehicle power state is set to the shift-switching permitted state". For example, the vehicle power state is set to the shift-switching permitted state in a form that the vehicle power state is switched to IGON by pushing the engine switch 40 while the brake pedal 74 is not depressed, a form that the vehicle power state is changed to the shift-switching permitted state before initiation of the engine starting associated with the engine starting operation while the vehicle power state is the shift-switching prohibited state, etc. Therefore, the predetermined waiting time TMwt needs to be set in consideration of a form in which the engine 12 is started. Thus, the predetermined waiting time TMwt includes a predefined maximum time required for the engine starting. The predefined maximum time corresponds to the second predefined time of the present invention. In other words, the predetermined waiting time TMwt is a waiting time of the shift switching before completion of the engine starting when the engine starting is performed.

When it is determined that the shift switching is permitted at the time of the engine starting operation performed by the driver, the engine-starting control portion 94 determines whether the CAN communication system has a failure between the engine-starting control ECU 93 and the SBW control ECU 97. For example, the engine-starting control portion 94 determines whether a failure preventing the transmission of the cranking signal Sest has occurred due to a failure in the CAN communication system. The failure preventing the transmission of the cranking signal Sest corresponds to the first failure of the present invention If it is determined that a failure preventing the transmission of the cranking signal Sest has occurred, the engine-starting control portion 94 makes a change such that the shift switching is prohibited and does not perform the engine starting associated with the engine starting operation. The engine-starting control portion 94 changes the vehicle power state from the shift-switching permitted state to the shift-switching prohibited state so as to make a change such that the shift switching is prohibited.

Figure 5:
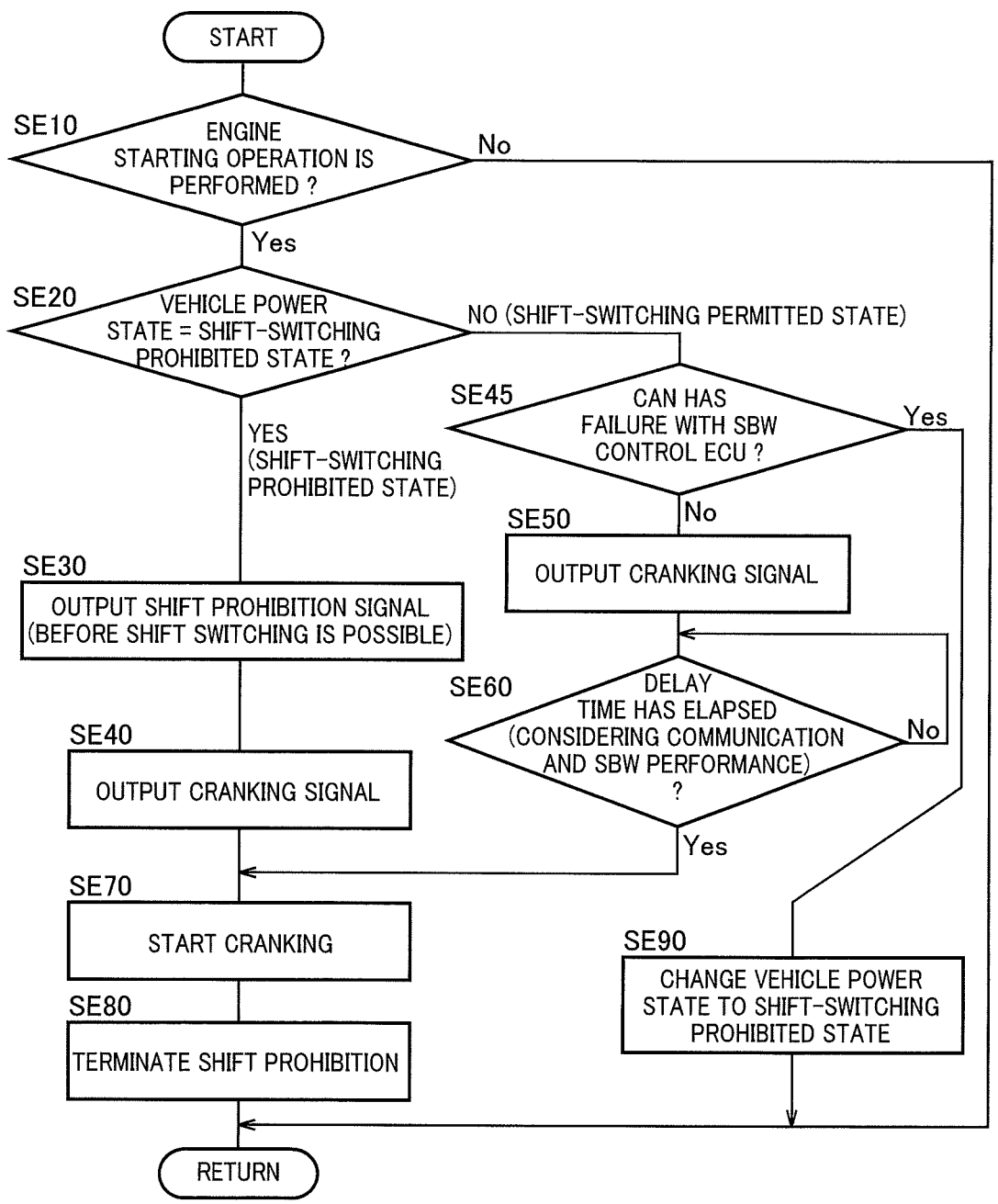
FIG. 5 is a flowchart for explaining the main portion of control actuation of the electronic control device, i.e., control actuation for suppressing the driver's uncomfortable feeling while preventing the engine starting from being performed simultaneously with the shift switching, is an example different from the flowchart of FIG. 2, and particularly shows the control actuation of an engine-starting control portion capable of dealing with a failure of a CAN communication system.

Each of FIGS. 5 and 6 is a flowchart for explaining a main portion of control actuation of the electronic control device 90, i.e., control actuation for suppressing a driver's uncomfortable feeling while preventing the engine starting from being performed simultaneously with the shift switching, and is repeatedly executed, for example. FIG. 5 is an example different from the flowchart of FIG. 2, and particularly shows the control actuation of the engine-starting control portion 94 capable of dealing with a failure of the CAN communication system. Steps in the flowchart of FIG. 5 correspond to the function of the engine-starting control portion 94. FIG. 6 is an example different from the flowchart of FIG. 3 and particularly shows the control actuation of the shift-switching control portion 98 capable of dealing with a failure of the CAN communication system. Steps in the flowchart of FIG. 6 correspond to the function of the shift-switching control portion 98.

In FIG. 5, first, at SE10, it is determined whether the engine starting operation is performed. If the determination of SE10 is negative, this routine is terminated. If the determination of SE10 is affirmative, it is determined at SE20 whether the vehicle power state is the shift-switching prohibited state. If the determination of SE20 is affirmative, the shift prohibition signal Sshp is output at SE30. Subsequently, at SE40, the cranking signal Sest is output. On the other hand, if the determination of SE20 is negative, it is determined at SE45 whether the CAN communication system has a failure with the SBW control ECU 97. If the determination of SE45 is negative, the cranking signal Sest is output at SE50. Subsequently, at SE60, it is determined whether the delay time TMdy has elapsed. When the determination of SE60 is negative, SE60 is repeatedly executed. After SE40 or if the determination of SE60 is affirmative, cranking of the engine 12 is started at SE70. Subsequently, at SE80, the shift prohibition is terminated after completion of the cranking. On the other hand, if the determination at SE45 is affirmative, the vehicle power state is changed from the shift-switching permitted state to the shift-switching prohibited state at SE90.

In FIG. 6, first, at SS10, it is determined whether the shift switching operation is performed. If the determination of SS10 is negative, this routine is terminated. If the determination of SS10 is affirmative, it is determined at SE15 whether the CAN communication system has a failure with the engine-starting control ECU 93. If the determination of SE15 is negative, it is determined at SS20 whether the shift switching is prohibited. If the determination at SS20 is affirmative, the shift switching operation is rejected at SS30. On the other hand, if the determination of SS15 is affirmative, it is determined at SS35 whether the predetermined waiting time TMwt has elapsed after the vehicle power state is set to the shift-switching permitted state. If the determination of SS20 is negative, or if the determination of SS35 is affirmative, the shift switching is performed at SS40. On the other hand, if the determination of SS35 is negative, the shift switching operation is rejected at SS50, as in SS30.

As described above, according to this example, when a failure preventing the transmission of the shift prohibition signal Sshp has occurred at the time of the shift switching operation and the predetermined waiting time TMwt has elapsed from permission of the shift switching, the P-switching control command signal Splock serving as a basis for the shift switching is output, so that even though the engine starting is initiated while the shift switching is permitted when a failure preventing the transmission of the shift prohibition signal Sshp has occurred, the engine starting may be prevented from being performed simultaneously with the shift switching. On the other hand, when the predetermined waiting time TMwt has not elapsed, the P-switching control command signal Splock is not output, so that when a failure preventing the transmission of the shift prohibition signal Sshp has occurred and the engine starting may be performed simultaneously with the shift switching, the shift switching is not performed.

According to this example, the predetermined waiting time TMwt includes the predefined maximum time required for the engine starting, so that even when a failure preventing the transmission of the shift prohibition signal Sshp has occurred, the engine starting may properly be prevented from being performed simultaneously with the shift switching.

According to this example, when the shift switching is permitted and a failure preventing the transmission of the cranking signal Sest has occurred at the time of the engine starting operation, a change is made such that the shift switching is prohibited, and the engine starting associated with the engine starting operation is not performed, so that when a failure preventing the transmission of the cranking signal Sest has occurred and the engine starting may be performed simultaneously with the shift switching, the engine starting is not performed. Additionally, when the engine starting operation is performed next time, the shift switching is prohibited, so that the engine starting may immediately be started.

Although the examples of the present invention have been described in detail with reference to the drawings, the present invention is also applicable in other forms.

For example, the shift-switching permitted state or the shift-switching prohibited state is determined based on the vehicle power state in the examples; however, the present invention is not limited to this form. For example, the shift-switching permitted state or the shift-switching prohibited state may be determined by determining a mutual control state between the shift-switching control portion 98 and the engine-starting control portion 94.

In the examples, the engine-starting control portion 94 determines whether the shift switching is being performed based on whether the delay time TMdy has elapsed; however, the present invention is not limited to this form. For example, the engine-starting control portion 94 may determine whether the shift switching is being performed based on whether a signal received from the shift-switching control portion 98 indicates that the shift switching is not being performed.

In the examples, the shift operation device 50 includes the two operation elements, i.e., the shift lever 52 and the P switch 54; however, the present invention is not limited to this form. For example, the shift operation device 50 may be such a shift operation device including operation positions such as P, R, N, and D corresponding to the shift positions of the automatic transmission 18, one operation element such as a lever or a dial operated to the operation positions, a position sensor electrically detecting that the operation element is operated to each of the operation positions.

In the examples, the switching device 60 switches the shift position of the automatic transmission 18 between the P position and the non-P position; however, the present invention is not limited to this form. For example, the switching device 60 may be a switching device switching the shift position of the automatic transmission 18 to each of positions such as P, R, N, and D positions.

In the examples, the power transmission device 16 includes the automatic transmission 18 and transmits the power of the engine 12 to the drive wheels 14; however, the present invention is not limited to this form. For example, in a series hybrid vehicle, the power transmission device may not include an automatic transmission and may transmit only the power of an electric motor to the drive wheels. Alternatively, the power transmission device may include an automatic transmission such as an electric continuously variable transmission. In the power transmission device without an automatic transmission, for example, the shift position is switched between the P position and the non-P position by a switching device as in the automatic transmission 18. In short, the present invention is applicable to any vehicle including an engine, a power transmission device, a shift operation device operated by a driver to an operation position corresponding to a shift position of the power transmission device, and a switching device performing shift switching for switching a shift position of the power transmission device through actuation of an electric actuator based on a control command signal corresponding to the operation position.

The above description is merely an embodiment and the present invention can be implemented in variously modified and improved forms based on the knowledge of those skilled in the art.

REFERENCE SIGNS LIST

10: vehicle
12: engine
18: automatic transmission
50: shift operation device
60: switching device
61: electric actuator
90: electronic control device (control device)
94: engine-starting control portion
98: shift-switching control portion
Sest: cranking signal (first signal)
Sshp: shift prohibition signal (second signal)

What is claimed is:

1. A control device of a vehicle including an engine, a power transmission device, a shift operation device operated by a driver to an operation position corresponding to a shift position of the power transmission device, and a switching device performing shift switching for switching the shift position of the power transmission device through actuation of an electric actuator based on a control command signal corresponding to the operation position, the control device comprising:
- a shift-switching control portion outputting the control command signal when it is determined that the shift switching is permitted, and not outputting the control command signal when it is determined that the shift switching is prohibited, at the time of a shift switching operation performed by the driver for causing the switching device to perform the shift switching; and
- an engine-starting control portion outputting a first signal causing the shift-switching control portion to determine that the shift switching is prohibited and initiating starting of the engine after determining that the shift switching is not being performed when it is determined that the shift switching is permitted at the time of an engine starting operation performed by the driver for starting the engine, and immediately initiating the engine when it is determined that the shift switching is prohibited.

2. The control device of the vehicle according to claim 1, wherein the engine-starting control portion determines whether the shift switching is being performed based on whether a predetermined delay time has elapsed from output of the first signal.

3. The control device of the vehicle according to claim 2, wherein the predetermined delay time includes a first predefined time that is a maximum time required for the shift switching.

4. The control device of the vehicle according to claim 1, wherein
the engine-starting control portion initiates starting of the engine while the shift switching is permitted, and wherein
the engine-starting control portion outputs a second signal causing the shift-switching control portion to maintain the determination that the shift switching is prohibited, and initiates starting of the engine when it is determined that the shift switching is prohibited at the time of the engine starting operation performed by the driver.

5. The control device of the vehicle according to claim 4, wherein at the time of the shift switching operation performed by the driver, the shift-switching control portion outputs the control command signal when a second failure preventing the transmission of the second signal has occurred and a predetermined waiting time has elapsed from permission of the shift switching, and suspends outputting the control command signal when the second failure has occurred and the predetermined waiting time has not elapsed.

6. The control device of the vehicle according to claim 5, wherein the predetermined waiting time includes a second predefined time that is a maximum time required for starting the engine.

7. The control device of the vehicle according to claim 1, wherein when it is determined the shift switching is permitted and a first failure preventing the transmission of the first signal has occurred at the time of the engine starting operation performed by the driver, the engine-starting control portion makes a change such that the shift switching is prohibited, and suspends starting the engine in association with the engine starting operation.

8. The control device of the vehicle according to claim 1, wherein each of the shift-switching control portion and the engine-starting control portion determines that the shift switching is permitted when a power supply state of the vehicle is a first state in which the shift switching is permitted, and determines that the shift switching is prohibited when the power supply state is a second state in which the shift switching is prohibited.

* * * * *